United States Patent
Jackson et al.

(10) Patent No.: US 9,038,489 B2
(45) Date of Patent: May 26, 2015

(54) SYSTEM AND METHOD FOR CONTROLLING A VACUUM PUMP THAT IS USED TO CHECK FOR LEAKS IN AN EVAPORATIVE EMISSIONS SYSTEM

(71) Applicant: GM Global Technology Operations LLC, Detroit, MI (US)

(72) Inventors: Robert Jackson, Brighton, MI (US); William R. Cadman, Fenton, MI (US); Paul William Rasmussen, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 13/651,533

(22) Filed: Oct. 15, 2012

(65) Prior Publication Data
US 2014/0102565 A1  Apr. 17, 2014

(51) Int. Cl.
| | |
|---|---|
| G01M 15/00 | (2006.01) |
| G01M 15/09 | (2006.01) |
| G01L 23/24 | (2006.01) |
| F02M 25/08 | (2006.01) |
| F02M 65/00 | (2006.01) |
| G01M 99/00 | (2011.01) |
| F04C 25/02 | (2006.01) |

(Continued)

(52) U.S. Cl.
CPC ......... *F02M 25/0809* (2013.01); *F02M 65/003* (2013.01); *G01M 99/008* (2013.01); *F04C 25/02* (2013.01); *F04C 28/06* (2013.01); *F04C 18/3441* (2013.01)

(58) Field of Classification Search
CPC .... F02D 2041/223–2041/225; F02M 25/0809; F02M 25/0836; F02M 65/003

USPC ......... 73/114.38–114.51, 49.7, 40, 49.2–49.3
See application file for complete search history.

(56) References Cited

U.S. PATENT DOCUMENTS

| | | | | |
|---|---|---|---|---|
| 3,396,666 A | * | 8/1968 | Moochhala et al. | ............ 418/82 |
| 4,751,501 A | | 6/1988 | Gut | |

(Continued)

FOREIGN PATENT DOCUMENTS

| | | |
|---|---|---|
| DE | 4321694 A1 | 1/1995 |
| DE | 19502776 C1 | 6/1996 |

(Continued)

OTHER PUBLICATIONS

Office Action dated Mar. 14, 2012 from German Patent Office for German Patent Application 102010026655.8; 6 Pages.

(Continued)

*Primary Examiner* — Eric S McCall
*Assistant Examiner* — Anthony W Megna Fuentes (57) ABSTRACT

A control system according to the principles of the present disclosure includes a fuel system diagnostic module and a pump control module. The fuel system diagnostic module performs a diagnostic test on a fuel system when a vacuum pump is switched off to prevent flow through the vacuum pump and thereby seal a portion of the fuel system from an atmosphere. The vacuum pump includes a cam ring, a rotor that rotates within the cam ring, and vanes that slide into and out of slots in the rotor as the rotor rotates. The pump control module switches on the vacuum pump for a predetermined period to force the vanes out of the slots and into contact with the cam ring to seal the vacuum pump before switching off the vacuum pump for the fuel system diagnostic test.

20 Claims, 5 Drawing Sheets

(51) Int. Cl.
    *F04C 28/06*     (2006.01)
    *F04C 18/344*    (2006.01)

(56) References Cited

U.S. PATENT DOCUMENTS

| | | | |
|---|---|---|---|
| 5,150,689 A | 9/1992 | Yano et al. | |
| 5,158,054 A | 10/1992 | Otsuka | |
| 5,317,909 A | 6/1994 | Yamada et al. | |
| 5,606,311 A | 2/1997 | Polidan et al. | |
| 5,616,157 A | 4/1997 | Mead et al. | |
| 5,750,888 A | 5/1998 | Matsumoto et al. | |
| 5,895,859 A | 4/1999 | Sawada et al. | 73/706 |
| 6,016,690 A | 1/2000 | Cook et al. | |
| 6,047,692 A | 4/2000 | Toyoda | |
| 6,164,123 A | 12/2000 | Corkill | |
| RE37,250 E | 7/2001 | Kayanuma | |
| 6,311,548 B1 | 11/2001 | Breidenbach et al. | |
| 6,363,921 B1 | 4/2002 | Cook et al. | 123/520 |
| 6,467,463 B2 | 10/2002 | Kitamura et al. | 123/516 |
| 6,508,235 B2 | 1/2003 | Fabre | |
| 6,526,760 B2 | 3/2003 | Fickel et al. | 62/7 |
| 6,536,261 B1 | 3/2003 | Weldon et al. | 73/49.7 |
| 6,761,154 B2 | 7/2004 | Takagi et al. | 123/520 |
| 6,874,523 B2 | 4/2005 | Yoshihara et al. | 137/202 |
| 6,970,775 B2 | 11/2005 | Lederle et al. | 73/40 |
| 6,988,396 B2 | 1/2006 | Matsubara et al. | 73/118.1 |
| 7,066,152 B2 | 6/2006 | Stroia et al. | 123/467 |
| 7,107,971 B2 | 9/2006 | Spink et al. | 123/520 |
| 7,383,826 B2 | 6/2008 | Kano et al. | |
| 7,438,060 B2 | 10/2008 | McLain | |
| 7,441,545 B1 | 10/2008 | Fisher et al. | 123/467 |
| 7,444,234 B2 | 10/2008 | Bauerle | |
| 8,108,127 B2 | 1/2012 | Grunwald et al. | |
| 8,155,917 B2 | 4/2012 | Maegawa | |
| 8,327,695 B2 | 12/2012 | Jackson et al. | |
| 8,353,273 B2 | 1/2013 | McLain et al. | |
| 8,560,158 B2 | 10/2013 | Wang et al. | |
| 2001/0027682 A1 | 10/2001 | Takagi et al. | |
| 2001/0032626 A1 | 10/2001 | Fabre | |
| 2002/0046609 A1 | 4/2002 | Ito | |
| 2003/0075156 A1 | 4/2003 | Morinaga et al. | |
| 2003/0183206 A1 | 10/2003 | Fujimoto et al. | |
| 2003/0226549 A1 | 12/2003 | Takagi et al. | |
| 2004/0089063 A1 | 5/2004 | Matsubara et al. | |
| 2004/0089064 A1* | 5/2004 | Kidokoro et al. | 73/118.1 |
| 2005/0240338 A1 | 10/2005 | Ardisana | |
| 2006/0090553 A1* | 5/2006 | Nagasaki et al. | 73/118.1 |
| 2007/0089721 A1 | 4/2007 | Amano et al. | |
| 2007/0189907 A1 | 8/2007 | Kunihiro et al. | |
| 2008/0135025 A1 | 6/2008 | McLain | |
| 2008/0190177 A1 | 8/2008 | Wiggins et al. | |
| 2009/0138173 A1 | 5/2009 | Liu | |
| 2009/0266147 A1 | 10/2009 | Maegawa | |
| 2009/0299561 A1 | 12/2009 | Matsumoto | |
| 2011/0011472 A1* | 1/2011 | McLain et al. | 137/624.12 |
| 2011/0123372 A1 | 5/2011 | Itoh et al. | |
| 2012/0097252 A1 | 4/2012 | McLain et al. | |
| 2013/0184963 A1 | 7/2013 | Jackson et al. | |

FOREIGN PATENT DOCUMENTS

| | | |
|---|---|---|
| DE | 19630985 A1 | 3/1997 |
| DE | 19710981 A1 | 10/1998 |
| DE | 10037939 A1 | 6/2001 |
| DE | 10245158 A1 | 4/2003 |
| DE | 102010026655 A1 | 8/2011 |

OTHER PUBLICATIONS

U.S. Appl. No. 13/350,141, filed Jan. 13, 2012, Jackson et al.
U.S. Appl. No. 13/832,766, filed Mar. 15, 2013, Jackson, et al.
U.S. Appl. No. 13/909,424, filed Jun. 4, 2013, Jackson, et al.
Office Action dated Dec. 17, 2014 from German Patent Office for German Patent Application No. 102013220186.9; 5 Pages.

* cited by examiner

SYSTEM AND METHOD FOR CONTROLLING A VACUUM PUMP THAT IS USED TO CHECK FOR LEAKS IN AN EVAPORATIVE EMISSIONS SYSTEM

FIELD

The present disclosure relates to systems and methods for controlling a vacuum pump that is used to check for leaks in an evaporative emissions system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. A fuel system supplies liquid fuel and/or vapor fuel to the engine. A fuel injector provides the engine with liquid fuel drawn from a fuel tank. The fuel system may include an evaporative emissions (EVAP) system that provides the engine with fuel vapor drawn from a canister.

Generally, liquid fuel is contained within the fuel tank. In some circumstances, the liquid fuel may vaporize and form fuel vapor. The canister stores the fuel vapor. The EVAP system includes a purge valve and a vent valve (e.g., a diurnal control valve). Operation of the engine causes a vacuum (i.e., low pressure relative to atmospheric pressure) to form within an intake manifold of the engine. The vacuum within the intake manifold and actuation of the purge and vent valves allows the fuel vapor to be drawn into the intake manifold, thereby purging the fuel vapor from the canister to the intake manifold.

SUMMARY

A control system according to the principles of the present disclosure includes a fuel system diagnostic module and a pump control module. The fuel system diagnostic module performs a diagnostic test on a fuel system when a vacuum pump is switched off to prevent flow through the vacuum pump and thereby seal a portion of the fuel system from an atmosphere. The vacuum pump includes a cam ring, a rotor that rotates within the cam ring, and vanes that slide into and out of slots in the rotor as the rotor rotates. The pump control module switches on the vacuum pump for a predetermined period to force the vanes out of the slots and into contact with the cam ring to seal the vacuum pump before switching off the vacuum pump for the fuel system diagnostic test.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A fuel system may include an evaporative emissions (EVAP) system, such as the EVAP system described above, and an EVAP leak check (ELC) system that checks for leaks in the EVAP system. The ELC system may include a vacuum pump having a suction side in fluid communication with the EVAP system and a discharge side in fluid communication with the atmosphere. The vacuum pump may be switched on to create a vacuum in the EVAP system. The vacuum pump may be switched off to seal the EVAP system from the atmosphere.

Figure 1:
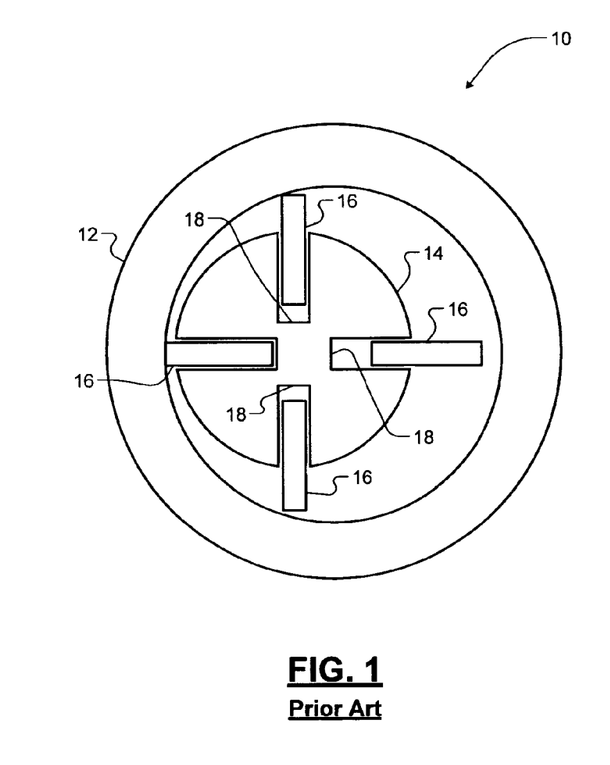
FIG. 1 is a schematic of an example vacuum pump according to the prior art.

Referring now to FIG. 1, a vacuum pump 10 according to the prior art includes a cam ring 12, a rotor 14 rotatably coupled to the cam ring 12, and vanes 16 slidably coupled to the rotor 14. As the rotor 14 rotates within the cam ring 12, the vanes 16 slide in and out of slots 18 in the rotor 14 to maintain contact with the cam ring 12 and thereby maintain a seal within the vacuum pump 10. In turn, gas is forced from the suction side of the vacuum pump 10 to the discharge side of the vacuum pump 10.

A control system and method according to the principles of the present disclosure performs diagnostics on the fuel system. When performing diagnostics such as a tank pressure sensor diagnostic or a purge valve diagnostic, the vacuum pump 10 is switched off to seal the suction side of the vacuum pump 10 from the atmosphere. When the vacuum pump 10 is switched off, the vanes 16 may slide into the slots 18 in the rotor 14 and out of contact with the cam ring 12. In turn, the suction side of the vacuum pump 10 may not be sealed from the atmosphere, which may lead to false failure diagnoses.

Thus, a control system and method according to the principles of the present disclosure switches on the vacuum pump 10 for a predetermined period (e.g., 5 seconds) before switching off the vacuum pump 10 to perform fuel system diagnostics. Switching on the vacuum pump 10 for the predetermined period exerts a centrifugal force on the vanes 16, forcing the vanes 16 to slide out of the slots 18 and into contact with the cam ring 12. In turn, the suction side of the vacuum pump 10 remains sealed while the fuel system diagnostics are performed, which avoids false failure diagnoses.

Figure 2:
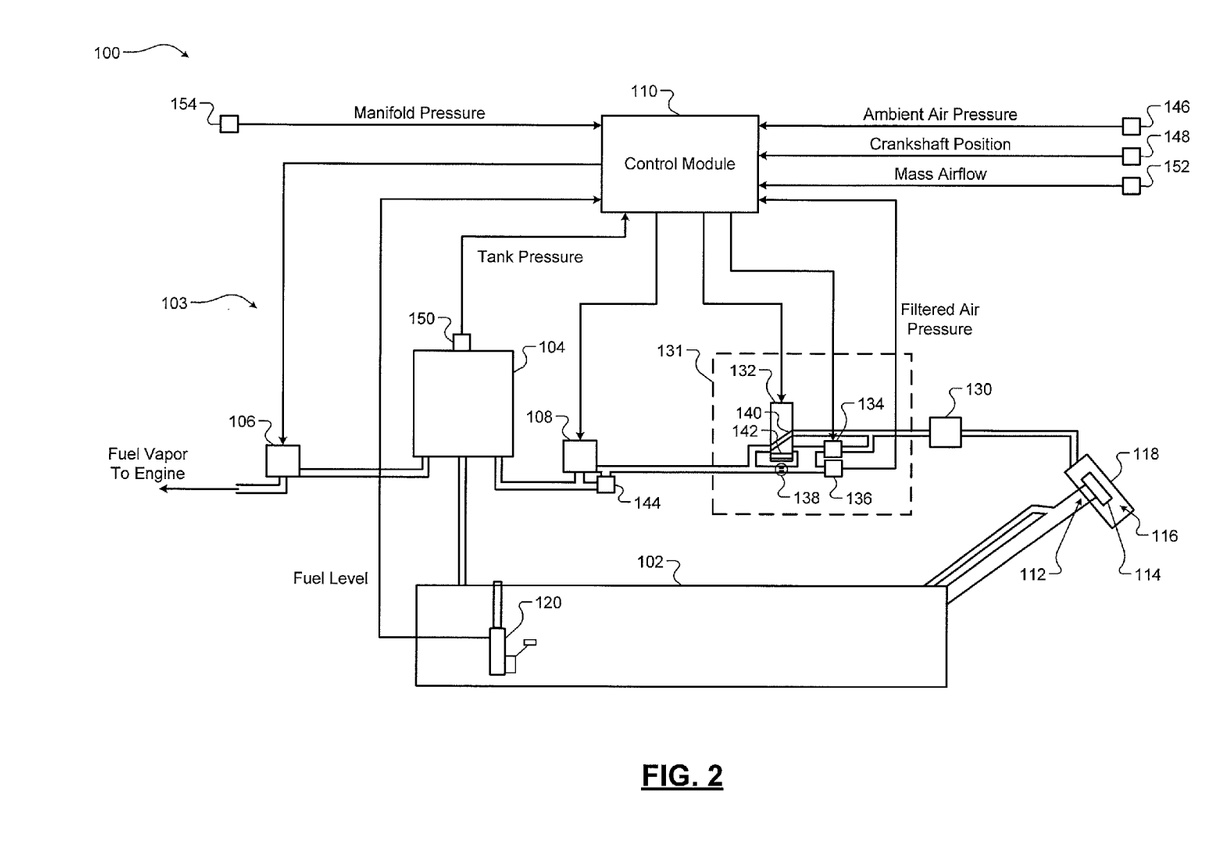
FIG. 2 is a functional block diagram of an example fuel system according to the principles of the present disclosure.

Referring now to FIG. 2, a fuel system 100 supplies fuel to an internal combustion engine (not shown) in a vehicle. More specifically, the fuel system 100 supplies liquid fuel and fuel vapor to the engine. For example only, the engine may be a gasoline engine, a diesel engine, and/or another suitable type of engine. The engine includes one or more cylinders within which a mixture of air and fuel is combusted to generate drive torque.

The fuel system 100 includes a fuel tank 102 that contains liquid fuel. Liquid fuel is drawn from the fuel tank 102 by one or more fuel pumps (not shown) and is supplied to the engine. Some conditions, such as heat, vibration, and radiation, may cause liquid fuel within the fuel tank 102 to vaporize.

The fuel system 100 includes an evaporative emissions (EVAP) system 103 that stores fuel vapor from the fuel tank 102 and provides the fuel vapor to the engine for combustion. The EVAP system 103 includes a canister 104, a purge valve 106, and a vent valve 108 (e.g., a diurnal control valve). In various implementations, the vent valve 108 may be omitted. The canister 104 traps and stores vaporized fuel (i.e., fuel vapor). For example only, the canister 104 may include one or more substances that store fuel vapor, such as charcoal.

Operation of the engine creates a vacuum within an intake manifold (not shown) of the engine. The purge valve 106 and the vent valve 108 are actuated (e.g., opened and closed) to draw fuel vapor from the canister 104 to the intake manifold for combustion. More specifically, actuation of the purge valve 106 and the vent valve 108 may be coordinated to purge fuel vapor from the canister 104. A control module 110, such as an engine control module, controls the actuation of the purge valve 106 and the vent valve 108 to control the provision of fuel vapor to the engine.

The control module 110 may independently actuate the purge valve 106 and the vent valve 108 between their respective open and closed positions. The control module 110 may provide ambient air (i.e., atmospheric air) to the canister 104 by actuating the vent valve 108 to its open position. While the vent valve 108 is in its open position, the control module 110 may actuate the purge valve 106 to its open position to purge fuel vapor from the canister 104 to the intake manifold. The control module 110 may control the rate at which fuel vapor is purged from the canister 104 (i.e., the purge rate). For example, the purge valve 106 may include a solenoid valve, and the control module 110 may control the purge rate by controlling a duty cycle of a signal applied to the purge valve 106.

The vacuum within the intake manifold draws fuel vapor from the canister 104 through the purge valve 106 to the intake manifold. The purge rate may be determined based on the duty cycle of the signal applied to the purge valve 106 and the amount of fuel vapor within the canister 104. Ambient air is drawn into the canister 104 through the open vent valve 108 as fuel vapor is drawn from the canister 104.

The control module 110 actuates the vent valve 108 to its open position and controls the duty cycle of the purge valve 106 during operation of the engine. When the engine is shutdown (e.g., the ignition key is off), the control module 110 actuates the purge valve 106 and the vent valve 108 to their respective closed positions. In this manner, the purge valve 106 and the vent valve 108 are generally maintained in their respective closed positions when the engine is not running.

Liquid fuel may be added to the fuel tank 102 via a fuel inlet 112. A fuel cap 114 closes the fuel inlet 112. The fuel cap 114 and the fuel inlet 112 are accessed via a fueling compartment 116. A fuel door 118 closes to seal the fueling compartment 116.

A fuel level sensor 120 measures the amount of liquid fuel within the fuel tank 102 and generates a fuel level signal based on the amount of liquid fuel within the fuel tank 102. For example only, the amount of liquid fuel in the fuel tank 102 may be expressed in terms of a volume, a percentage of a maximum volume of the fuel tank 102, or another suitable measure of the amount of fuel in the fuel tank 102.

The ambient air provided to the canister 104 through the vent valve 108 may be drawn from the fueling compartment 116. A filter 130 receives the ambient air and filters various particulate from the ambient air. For example only, the filter 130 may filter particulate having a dimension of more than a predetermined dimension, such as greater than approximately 5 microns.

The fuel system 100 also includes an EVAP leak check (ELC) system 131 that checks for leaks in the EVAP system 103. The ELC system 131 includes a switching valve 132, a vacuum pump 134, an ELC pressure sensor 136, and a reference orifice 138. The control module 110 controls the switching valve 132 and the vacuum pump 134, and receives pressures detected by the pressure sensor 136. The vacuum pump 10 described above with reference to FIG. 1 is an example implementation of the vacuum pump 134.

The switching valve 132 is actuated to adjust the flow of the ambient air to the vent valve 108. The switching valve 132 is actuated to a vent position to allow ambient air to flow through a first path 140 in the switching valve 132 to the vent valve 108, thereby venting the suction side of the vacuum pump 134 to the atmosphere. The switching valve 132 is actuated to a pump position to place the suction side of the vacuum pump 134 in fluid communication with the vent valve 108 via a second path 142 in the switching valve 132. Also, when the switching valve 132 is in the pump position, the switching valve 132 prevents ambient air from flowing to the vent valve 108 and thereby seals the suction side of the vacuum pump 134 from the atmosphere.

The vacuum pump 134 may be used in conjunction with actuation of the purge valve 106, the vent valve 108, and/or the switching valve 132 to check for leaks in the EVAP system 103. The EVAP system 103, the switching valve 132, and the pressure sensor 136 are on the suction side of the vacuum pump 134. The filter 130 is on the discharge side of the vacuum pump 134.

When the purge valve 106 is closed and the vent valve 108 is open while the vacuum pump 134 is switched on, the vacuum pump 134 creates a vacuum between the purge valve 106 and the vacuum pump 134. When the vent valve 108 is closed while the vacuum pump 134 is switched on, the vacuum pump 134 creates a vacuum between the vent valve 108 and the vacuum pump 134. A relief valve 144 may be used to discharge the pressure or vacuum from the fuel tank 102 to the suction side of the vacuum pump 134.

The ELC pressure sensor 136 measures the pressure on the suction side of the vacuum pump 134 at a location between the vent valve 108 and the vacuum pump 134. The ELC pressure sensor 136 generates an ELC pressure signal indicating the measured pressure. The ELC pressure sensor 136 provides the ELC pressure signal to the control module 110.

The control module 110 may also receive signals from other sensors such as an ambient pressure sensor 146, a crankshaft position sensor 148, a tank pressure sensor 150, a mass airflow sensor 152, and a manifold pressure sensor 154. The ambient pressure sensor 146 measures the pressure of the ambient air and generates an ambient air pressure signal indicating the ambient air pressure. The crankshaft position sensor 148 measures the position of a crankshaft in the engine and generates a crankshaft position signal indicating the crankshaft position.

The tank pressure sensor 150 measures the pressure of the fuel tank 102 and generates a tank pressure signal indicating the tank pressure. The tank pressure sensor 150 may be positioned in the fuel tank 102 or at another location within the EVAP system 103 that is at the same pressure as the fuel tank 102, such as within the canister 104. In various implementations, tank vacuum, which is the difference between the tank pressure and the ambient air pressure, may be measured or determined. In one implementation, the tank pressure sensor 150 may measure the ambient air pressure, and the tank vacuum may be determined based on the tank pressure and the ambient air pressure measured by the tank pressure sensor 150. Alternatively, the tank vacuum may be determined based on the tank pressure measured by the tank pressure sensor 150 and the ambient air pressure measured by the ambient pressure sensor 146.

The mass airflow sensor 152 measures a mass flow rate of intake air flowing into the engine. The manifold pressure sensor 154 measures the pressure of air within an intake manifold of the engine. In various implementations, engine vacuum, which is the difference between ambient air pressure and the pressure within the intake manifold, may be measured or determined.

The control module 110 performs diagnostics on the fuel system 100. When performing certain fuel system diagnostics including a tank pressure sensor diagnostic and a purge valve diagnostic, the control module 110 actuates the switching valve 132 to the pump position and switches off the vacuum pump 134. The control module 110 does this to seal the suction side of the vacuum pump 134 from the atmosphere. Before switching off the vacuum pump 134, the control module 110 switches on the vacuum pump 134 for a predetermined period (e.g., 5 seconds) to ensure that the vacuum pump 134 is sealed when the vacuum pump 134 is switched off.

Figure 3:
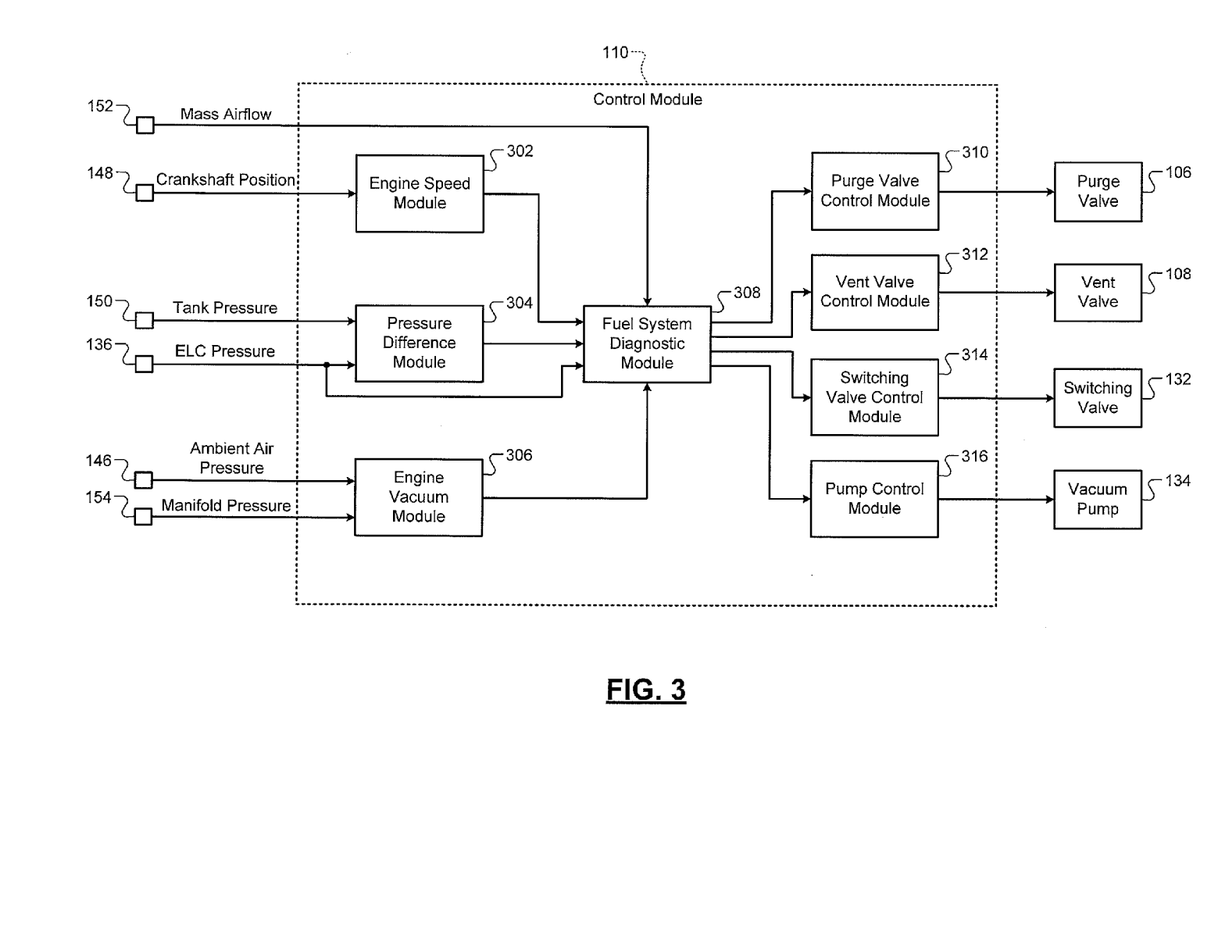
FIG. 3 is a functional block diagram of an example control system according to the principles of the present disclosure.

Referring now to FIG. 3, an example implementation of the control module 110 includes an engine speed module 302, a pressure difference module 304, an engine vacuum module 306, and a fuel system diagnostic module 308. The engine speed module 302 determines engine speed based input received from the crankshaft position sensor 148. The engine speed module 302 may determine the engine speed based on an amount of crankshaft rotation between tooth detections and the corresponding period. The engine speed module 302 outputs the engine speed.

The engine vacuum module 306 determines engine vacuum based on input received from the ambient pressure sensor 146 and the manifold pressure sensor 154. As discussed above, engine vacuum is the difference between the ambient air pressure and the pressure within the intake manifold. The engine vacuum module 306 outputs the engine vacuum.

The fuel system diagnostic module 308 performs various diagnostics on the fuel system 100 including the tank pressure sensor diagnostic and the purge valve diagnostic. When performing fuel system diagnostics, the fuel system diagnostic module 308 sends instructions to a purge valve control module 310, a vent valve control module 312, a switching valve control module 314, and/or a pump control module 316. The purge valve control module 310, the vent valve control module 312, the switching valve control module 314, and the pump control module 316 control the purge valve 106, the vent valve 108, the switching valve 132, the vacuum pump 134, respectively.

When performing certain fuel system diagnostics including the tank pressure sensor diagnostic and the purge valve diagnostic, the fuel system diagnostic module 308 instructs the pump control module 316 to switch off the vacuum pump 134. In turn, the pump control module 316 switches on the vacuum pump 134 for a predetermined period (e.g., 5 seconds) before switching off the vacuum pump 134. This ensures that the vacuum pump 134 is sealed when the vacuum pump 134 is switched off.

To perform the tank pressure sensor diagnostic, the fuel system diagnostic module 308 initially sends instructions to close the purge valve 106, close the vent valve 108, actuate the switching valve 132 to the vent position, and switch off the vacuum pump 134. The fuel system diagnostic module 308 then sends instructions to actuate the switching valve 132 to the pump position and opens the vent valve 108 to place the ELC pressure sensor 136 in fluid communication with the interior of the fuel tank 102.

The fuel system diagnostic module 308 then waits for a stabilization period to elapse. The stabilization period allows the pressure within the fuel tank 102 and the pressure at the ELC pressure sensor 136 to equalize. The fuel system diagnostic module 308 then selectively diagnoses a fault in the tank pressure sensor 150 based on a difference between the ELC pressure measured by the ELC pressure sensor 136 and the tank pressure measured by the tank pressure sensor 150.

The pressure difference module 304 determines the difference between the ELC pressure and the tank pressure. The pressure difference module 304 receives the ELC pressure signal and the tank pressure signal from the ELC pressure sensor 136 and the tank pressure sensor 150, respectively. The pressure difference module 304 may determine the difference between the ELC pressure and the tank pressure several times during a diagnostic period and determine an average of the pressure differences.

The fuel system diagnostic module 308 may diagnose a fault in the tank pressure sensor 150 when the average difference between the ELC pressure and the tank pressure is greater than a predetermined value. The fuel system diagnostic module 308 sends instructions to close the vent valve 108 and actuate the switching valve 132 to the vent position at the end of the tank pressure sensor diagnostic.

The fuel system diagnostic module 308 performs the purge valve diagnostic when the engine is running and the purge valve 106 is open. The fuel system diagnostic module 308 may only perform the purge valve diagnostic when diagnostic conditions are satisfied to ensure that flow through the purge valve 106 is reliable. The fuel system diagnostic module 308 may monitor various parameters and determine that the diagnostic conditions are satisfied when the parameters are within thresholds.

The parameters may be compared to hysteresis thresholds to reduce cycling between enabling the purge valve diagnostic and disabling the purge valve diagnostic. The hysteresis thresholds for each parameter may include a pair of predetermined lower limits and a pair of predetermined upper limits that are greater than the predetermined lower limits. A diagnostic condition may be satisfied and the purge valve diagnostic may be enabled when a parameter is greater than the higher value of the predetermined lower limits and less than the lower value of the predetermined upper limits. The purge valve diagnostic may then be disabled when the parameter is less than the lower value of the predetermined lower limits or greater than the higher value of the predetermined upper limits.

The parameters may include the engine speed, the mass flow rate of intake air, the engine vacuum, a purge valve duty cycle, a mass flow rate of purge flow, and a purge flow percentage of intake air. The purge valve duty cycle may be determined based on a command signal sent to the purge valve 106. The mass flow rate of purge flow may be estimated based on various parameters such as the purge valve duty cycle and engine vacuum. The purge flow percentage of intake air may be determined by dividing the mass flow rate of purge flow by the mass flow rate of intake air.

Example hysteresis thresholds for the engine speed include lower limits of 1500 revolutions per minute (RPM) and 1600 RPM and upper limits of 3300 RPM and 3400 RPM. Example hysteresis thresholds for the mass flow rate of intake air include lower limits of 9 grams per second (g/s) and 10 g/s and upper limits of 32 g/s and 34 g/s. Example hysteresis thresholds for the engine vacuum include lower limits of 10 kilopascals (kPa) and 11 kPa and upper limits of 35 kPa and 37 kPa.

Example hysteresis thresholds for the purge valve duty cycle include a lower limit of 15 percent and an upper limit of 16 percent. Example hysteresis thresholds for the mass flow rate of purge flow include a lower limit of 0.13 g/s and an upper limit of 0.14 g/s. Example hysteresis thresholds for the purge flow percentage of intake air include a lower limit of 1.1 percent and an upper limit of 1.45 percent.

When the diagnostic conditions are satisfied, the fuel system diagnostic module 308 sends instructions to actuate the switching valve 132 to the pump position and switch off the vacuum pump 134 to seal the suction side of the vacuum pump 134. The fuel system diagnostic module 308 then waits for a stabilization period (e.g., 0.2 seconds) before recording an initial value of the ELC pressure. The fuel system diagnostic module 308 then monitors the ELC pressure for a diagnostic period.

The fuel system diagnostic module 308 determines a difference between the initial value of the ELC pressure and values of the ELC pressure observed during the diagnostic period. If a difference between the initial value and a value observed during the diagnostic period is greater than a predetermined value (e.g., 2 kPa), the fuel system diagnostic module 308 determines that flow through the purge valve 106 is present. If the differences between the initial value and values observed during the diagnostic period are less than or equal to the predetermined value, the fuel system diagnostic module 308 determines that flow through the purge valve 106 is not present. The fuel system diagnostic module 308 may diagnose a fault in the purge valve 106 when flow through the purge valve 106 is not present. The fuel system diagnostic module 308 sends instructions to actuate the switching valve 132 to the vent position at the end of the purge valve diagnostic.

Figure 4:
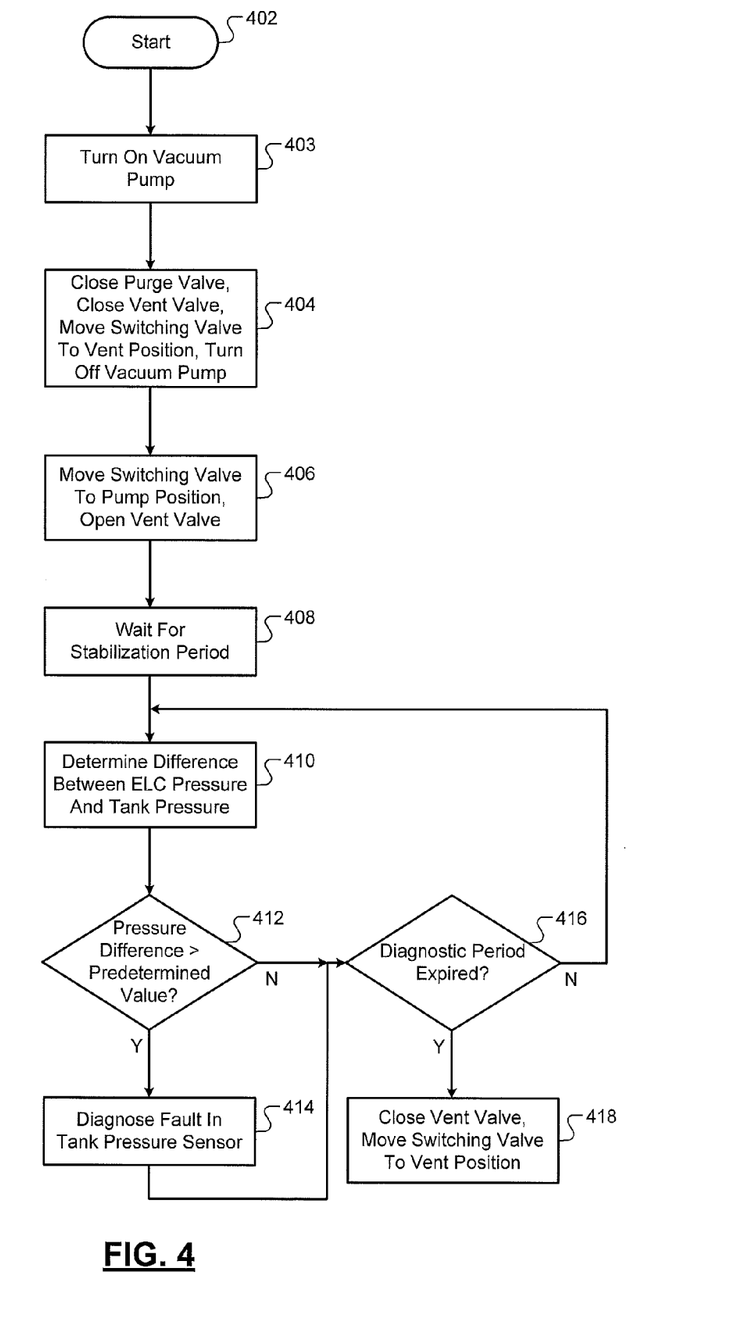
FIGS. 4 and 5 are flowcharts illustrating example fuel system diagnostic methods according to the principles of the present disclosure.

Referring now to FIG. 4, a method for performing a tank pressure sensor diagnostic begins at 402. While the method may apply to various types of fuel systems, for illustration purposes only, the method is described with reference to the fuel system 100 shown in FIG. 1. At 403, the method switches on the vacuum pump 134 for a predetermined period (e.g., 5 seconds) to ensure that the vacuum pump 134 is sealed when the vacuum pump 134 is switched off. At 404, the method closes the purge valve 106, closes the vent valve 108, actuates the switching valve 132 to the vent position, and switches off the vacuum pump 134. At 406, the method actuates the switching valve 132 to the pump position and opens the vent valve 108 to place the ELC pressure sensor 136 in fluid communication with the interior of the fuel tank 102.

At 408, the method waits for a stabilization period to elapse. The stabilization period allows the pressure within the fuel tank 102 and the pressure at the ELC pressure sensor 136 to equalize. At 410, the method determines a difference between the ELC pressure measured by the ELC pressure sensor 136 and the tank pressure measured by the tank pressure sensor 150. The method may determine an average difference between the ELC pressure and the tank pressure during a diagnostic period.

At 412, the method determines whether the (e.g., average) difference between the ELC pressure and the tank pressure is greater than a predetermined value. If the difference between the ELC pressure and the tank pressure is greater than the predetermined value, the method continues at 414. Otherwise, the method continues at 416. At 414, the method diagnoses a fault in the tank pressure sensor 150. At 416, the method determines whether the diagnostic period is expired.

If the diagnostic period is expired, the method continues at 418. Otherwise, the method continues at 410. At 418, the method closes the vent valve 108 and actuates the switching valve 132 to the vent position to end the tank pressure sensor diagnostic.

Figure 5:
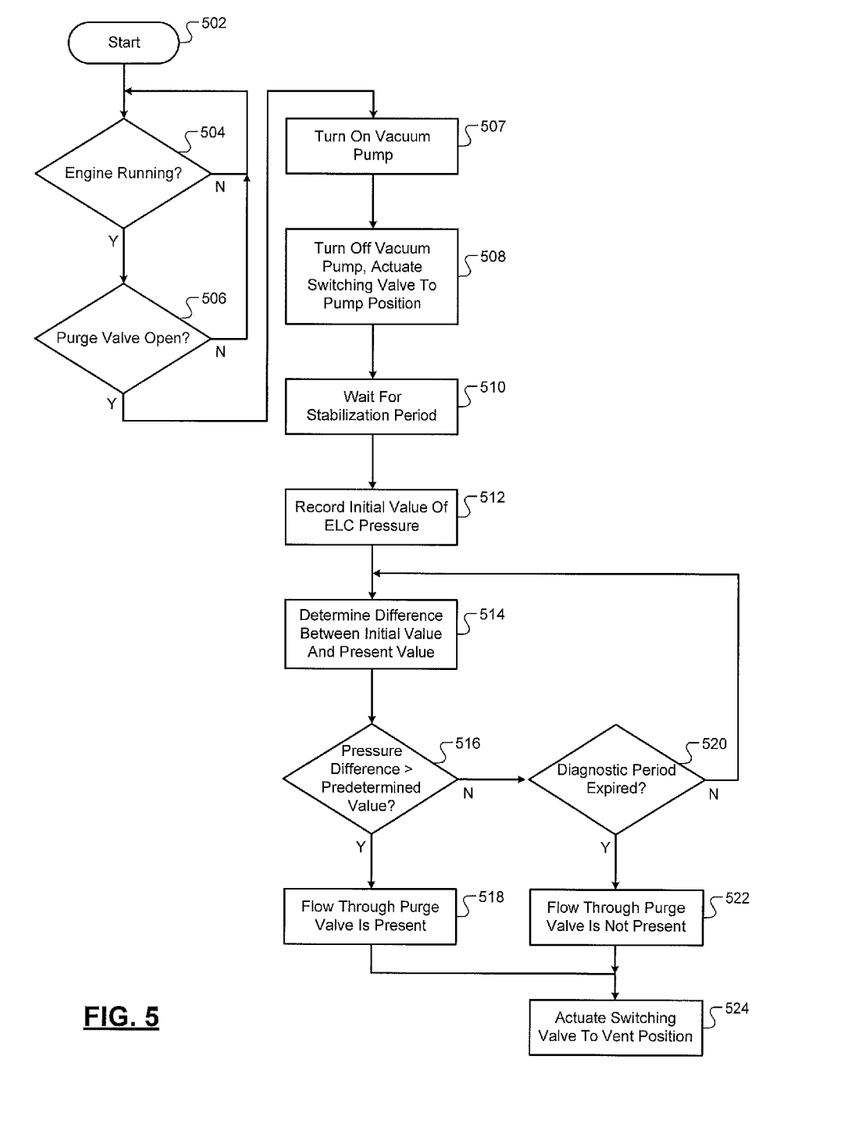

Referring now to FIG. 5, a method for performing a purge valve diagnostic begins at 502. While the method may apply to various types of fuel systems, for illustration purposes only, the method is described with reference to the fuel system 100 shown in FIG. 1. At 504, the method determines whether an engine receiving fuel from the fuel system 100 is running. If the engine is running, the method continues at 506. At 506, the method determines whether the purge valve 106 is open. If the purge valve 106 is open, the method continues at 508. Otherwise, the method continues at 504.

The method may only perform the purge valve diagnostic when diagnostic conditions are satisfied to ensure that flow through the purge valve 106 is reliable. The method may monitor various parameters and determine that the diagnostic conditions are satisfied when the parameters are within thresholds. The parameters may be compared to hysteresis thresholds to reduce cycling between enabling the purge valve diagnostic and disabling the purge valve diagnostic.

The hysteresis thresholds for each parameter may include a pair of predetermined lower limits and a pair of predetermined upper limits that are greater than the predetermined lower limits. A diagnostic condition may be satisfied and the purge valve diagnostic may be enabled when a parameter is greater than the higher value of the predetermined lower limits and less than the lower value of the predetermined upper limits. The purge valve diagnostic may then be disabled when the parameter is less than the lower value of the predetermined lower limits or greater than the higher value of the predetermined upper limits.

The parameters may include the engine speed, the mass flow rate of intake air, the engine vacuum, a purge valve duty cycle, a mass flow rate of purge flow, and a purge flow percentage of intake air. The purge valve duty cycle may be determined based on a command signal sent to the purge valve 106. The mass flow rate of purge flow may be estimated based on various parameters such as the purge valve duty cycle and engine vacuum. The purge flow percentage of intake air may be determined by dividing the mass flow rate of purge flow by the mass flow rate of intake air.

Example hysteresis thresholds for the engine speed include lower limits of 1500 RPM and 1600 RPM and upper limits of 3300 RPM and 3400 RPM. Example hysteresis thresholds for the mass flow rate of intake air include lower limits of 9 g/s and 10 g/s and upper limits of 32 g/s and 34 g/s. Example hysteresis thresholds for the engine vacuum include lower limits of 10 kPa and 11 kPa and upper limits of 35 kPa and 37 kPa. Example hysteresis thresholds for the purge valve duty cycle include a lower limit of 15 percent and an upper limit of 16 percent. Example hysteresis thresholds for the mass flow rate of purge flow include a lower limit of 0.13 g/s and an upper limit of 0.14 g/s. Example hysteresis thresholds for the purge flow percentage of intake air include a lower limit of 1.1 percent and an upper limit of 1.45 percent.

At 507, the method switches on the vacuum pump 134 for a predetermined period (e.g., 5 seconds) to ensure that the vacuum pump 134 is sealed when the vacuum pump 134 is switched off. At 508, the method actuates the switching valve 132 to the pump position and switches off the vacuum pump 134 to seal the suction side of the vacuum pump 134. At 510, the method waits for a stabilization period (e.g., 0.2 seconds). At 512, the method records an initial value of the ELC pressure. At 514, the method determines a difference between a present value of the ELC pressure and the initial value of the ELC pressure.

At 516, the method determines whether the difference between the present value of the ELC pressure and the initial value of the ELC pressure is greater than a predetermined value (e.g., 2 kPa). If the difference between the present value of the ELC pressure and the initial value of the ELC pressure is greater than the predetermined value, the method continues at 518 and determines that flow through the purge valve 106 is present. Otherwise, the method continues at 520.

At 520, the method determines whether the diagnostic period is expired. If the diagnostic period is expired, the method continues at 522 and determines that flow through the purge valve 106 is not present. Otherwise, the method continues at 514. At 524, the method actuates the switching valve 132 to the vent position to end the purge valve diagnostic.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:
1. A control system comprising:
   a fuel system diagnostic module that:
      performs a diagnostic test on a fuel system when a vacuum pump is switched off to prevent flow through the vacuum pump and thereby seal a portion of the fuel system from an atmosphere, wherein the vacuum pump includes a cam ring, a rotor that rotates within the cam ring, and vanes that slide into and out of slots in the rotor as the rotor rotates; and
      provides an instruction to switch off the vacuum pump; and
   a pump control module that, in response to the instruction to switch off the vacuum pump, switches on the vacuum pump for a predetermined period to force the vanes out of the slots and into contact with the cam ring to seal the vacuum pump before switching off the vacuum pump for the fuel system diagnostic test.

2. The control system of claim 1 wherein the fuel system includes a fuel tank, an evaporative emissions (EVAP) system that provides fuel vapor from the fuel tank to an engine, and an EVAP leak check (ELC) system that checks for leaks in the EVAP system.

3. The control system of claim 2 wherein the ELC system includes the vacuum pump and an ELC pressure sensor that measures pressure within the ELC system.

4. The control system of claim 3 wherein the fuel system includes a tank pressure sensor that measures pressure within the fuel tank.

5. The control system of claim 4 wherein the fuel system diagnostic module selectively diagnoses a fault in the tank pressure sensor based on a difference between the tank pressure and the ELC system pressure when the vacuum pump is switched off.

6. The control system of claim 5 wherein the fuel system diagnostic module diagnoses the fault in the tank pressure sensor when the difference between the tank pressure and the ELC system pressure is greater than a predetermined value.

7. The control system of claim 3 wherein the EVAP system includes a canister that stores fuel vapor from the fuel tank and a purge valve that opens to allow fuel vapor to flow from the canister to an intake manifold of the engine.

8. A control system comprising:
   a fuel system diagnostic module that performs a diagnostic test on a fuel system when a vacuum pump is switched off to prevent flow through the vacuum pump and thereby seal a portion of the fuel system from an atmosphere, wherein the vacuum pump includes a cam ring, a rotor that rotates within the cam ring, and vanes that slide into and out of slots in the rotor as the rotor rotates; and
   a pump control module that switches on the vacuum pump for a predetermined period to force the vanes out of the slots and into contact with the cam ring to seal the vacuum pump before switching off the vacuum pump for the fuel system diagnostic test, wherein the fuel system includes a fuel tank, an evaporative emissions (EVAP) system that provides fuel vapor from the fuel tank to an engine, and an EVAP leak check (ELC) system that checks for leaks in the EVAP system, wherein the ELC system includes the vacuum pump and an ELC pressure sensor that measures pressure within the ELC system, wherein the EVAP system includes a canister that stores fuel vapor from the fuel tank and a purge valve that opens to allow fuel vapor to flow from the canister to an intake manifold of the engine, and wherein the fuel system diagnostic module selectively diagnoses a fault in the purge valve based on a change in the ELC system pressure when the vacuum pump is switched off.

9. The control system of claim 8 further comprising a pressure difference module that determines a difference between an initial value of the ELC system pressure during a diagnostic period and a present value of the ELC system pressure during the diagnostic period.

10. The control system of claim 9 wherein the fuel system diagnostic module diagnoses the fault in the purge valve when the difference between the initial value of the ELC system pressure and the present value of the ELC system pressure is less than a predetermined value throughout the diagnostic period.

11. A method comprising:
performing a diagnostic test on a fuel system when a vacuum pump is switched off to prevent flow through the vacuum pump and thereby seal a portion of the fuel system from an atmosphere, wherein the vacuum pump includes a cam ring, a rotor that rotates within the cam ring, and vanes that slide into and out of slots in the rotor as the rotor rotates;
providing an instruction to switch off the vacuum pump; and
in response to the instruction to switch off the vacuum pump, switching on the vacuum pump for a predetermined period to force the vanes out of the slots and into contact with the cam ring to seal the vacuum pump before switching off the vacuum pump for the fuel system diagnostic test.

12. The method of claim 11 wherein the fuel system includes a fuel tank, an evaporative emissions (EVAP) system that provides fuel vapor from the fuel tank to an engine, and an EVAP leak check (ELC) system that checks for leaks in the EVAP system.

13. The method of claim 12 wherein the ELC system includes the vacuum pump and an ELC pressure sensor that measures pressure within the ELC system.

14. The method of claim 13 wherein the fuel system includes a tank pressure sensor that measures pressure within the fuel tank.

15. The method of claim 14 further comprising selectively diagnosing a fault in the tank pressure sensor based on a difference between the tank pressure and the ELC system pressure when the vacuum pump is switched off.

16. The method of claim 15 further comprising diagnosing the fault in the tank pressure sensor when the difference between the tank pressure and the ELC system pressure is greater than a predetermined value.

17. The method of claim 13 wherein the EVAP system includes a canister that stores fuel vapor from the fuel tank and a purge valve that opens to allow fuel vapor to flow from the canister to an intake manifold of the engine.

18. A method comprising:
performing a diagnostic test on a fuel system when a vacuum pump is switched off to prevent flow through the vacuum pump and thereby seal a portion of the fuel system from an atmosphere, wherein the vacuum pump includes a cam ring, a rotor that rotates within the cam ring, and vanes that slide into and out of slots in the rotor as the rotor rotates; and
switching on the vacuum pump for a predetermined period to force the vanes out of the slots and into contact with the cam ring to seal the vacuum pump before switching off the vacuum pump for the fuel system diagnostic test, wherein the fuel system includes a fuel tank, an evaporative emissions (EVAP) system that provides fuel vapor from the fuel tank to an engine, and an EVAP leak check (ELC) system that checks for leaks in the EVAP system, wherein the ELC system includes the vacuum pump and an ELC pressure sensor that measures pressure within the ELC system, and wherein the EVAP system includes a canister that stores fuel vapor from the fuel tank and a purge valve that opens to allow fuel vapor to flow from the canister to an intake manifold of the engine, the method further comprising selectively diagnosing a fault in the purge valve based on a change in the ELC system pressure when the vacuum pump is switched off.

19. The method of claim 18 further comprising determining a difference between an initial value of the ELC system pressure during a diagnostic period and a present value of the ELC system pressure during the diagnostic period.

20. The method of claim 19 further comprising diagnosing the fault in the purge valve when the difference between the initial value of the ELC system pressure and the present value of the ELC system pressure is less than a predetermined value throughout the diagnostic period.

* * * * *